United States Patent
Saxton et al.

(10) Patent No.: US 6,702,945 B2
(45) Date of Patent: Mar. 9, 2004

(54) IONIC MEMBRANES FOR ORGANIC SULFUR SEPARATION FROM LIQUID HYDROCARBON SOLUTIONS

(75) Inventors: Robert J. Saxton, Pleasanton, CA (US); Bhupender S. Minhas, Bel Air, MD (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 217 days.

(21) Appl. No.: 10/021,801

(22) Filed: Dec. 12, 2001

(65) Prior Publication Data

US 2002/0130079 A1 Sep. 19, 2002

Related U.S. Application Data

(60) Provisional application No. 60/258,503, filed on Dec. 28, 2000.

(51) Int. Cl.[7] .......................... B01D 61/14; B01D 61/00; C10G 31/09; C10G 31/11
(52) U.S. Cl. .................. 210/649; 210/650; 210/651; 208/208 R; 585/818
(58) Field of Search ................. 210/649, 650, 210/651; 208/208 R, 219, 226, 238; 585/818

(56) References Cited

U.S. PATENT DOCUMENTS

| | | | |
|---|---|---|---|
| 2,947,687 A | 8/1960 | Lee | 210/23 |
| 3,043,891 A | 7/1962 | Stuckey | 260/674 |
| 3,556,991 A | 1/1971 | Gerhold | 208/321 |
| 4,532,029 A | 7/1985 | Black et al. | 208/308 |
| 4,798,674 A | 1/1989 | Pastemak et al. | 210/640 |
| 4,802,987 A | 2/1989 | Black | 210/640 |
| 4,846,977 A | 7/1989 | DeVellis et al. | 210/640 |
| 4,944,880 A | 7/1990 | Ho et al. | 210/640 |
| 4,962,271 A | 10/1990 | Black et al. | 585/819 |
| 4,997,906 A | 3/1991 | Thaler et al. | 528/272 |
| 5,019,666 A | 5/1991 | Sartori et al. | 585/819 |
| 5,055,631 A | 10/1991 | Sartori et al. | 585/819 |
| 5,288,712 A | 2/1994 | Chen | 210/640 |
| 5,396,019 A | 3/1995 | Sartori et al. | 585/819 |
| 5,498,823 A | 3/1996 | Noble et al. | 585/818 |
| 5,635,055 A | 6/1997 | Sweet et al. | 208/99 |
| 5,643,442 A | 7/1997 | Sweet et al. | 208/302 |
| 5,858,212 A | 1/1999 | Darcy | 208/208 R |
| 5,905,182 A | 5/1999 | Streicher et al. | 585/804 |
| 6,187,196 B1 * | 2/2001 | Way et al. | 210/640 |
| 6,231,755 B1 | 5/2001 | Mesher et al. | 208/237 |
| 6,274,785 B1 | 8/2001 | Gore | 585/833 |
| 2002/0153284 A1 | 10/2002 | White et al. | 208/209 |

OTHER PUBLICATIONS

"Organic Liquid Mixtures Separation by Permselective Polymer Membranes. 1. Selection and Characteristics of Dense Isotroic Membranes Employed in the Pervaporation Process," by Israel Cabasso, The Polymer Research Institute, State University of New York, College of Environmental Science and Forestry, Syracuse, NY 13210. Published in the Ind. Eng. Chem. Prod. Res. Dev., vol. 22, No. 2, 1963 American Chemical Society, pp. 313–319.

* cited by examiner

Primary Examiner—John Kim
(74) Attorney, Agent, or Firm—Paul E. Purwin; Gerald J. Hughes

(57) ABSTRACT

Methods for the separation of sulfur compounds from a hydrocarbon mixture using an ionic membrane are provided. Preferred ionic membranes are Nafion®-type (polymers of perfluorosulfonic acid) membranes and derivatives thereof. Preferred applications include the removal of sulfur contaminants from light cracked naphthas.

13 Claims, 1 Drawing Sheet

Process For Separation of a Hydrocarbon Mixture into Sulfur-Rich and a Sulfur-Lean Fractions

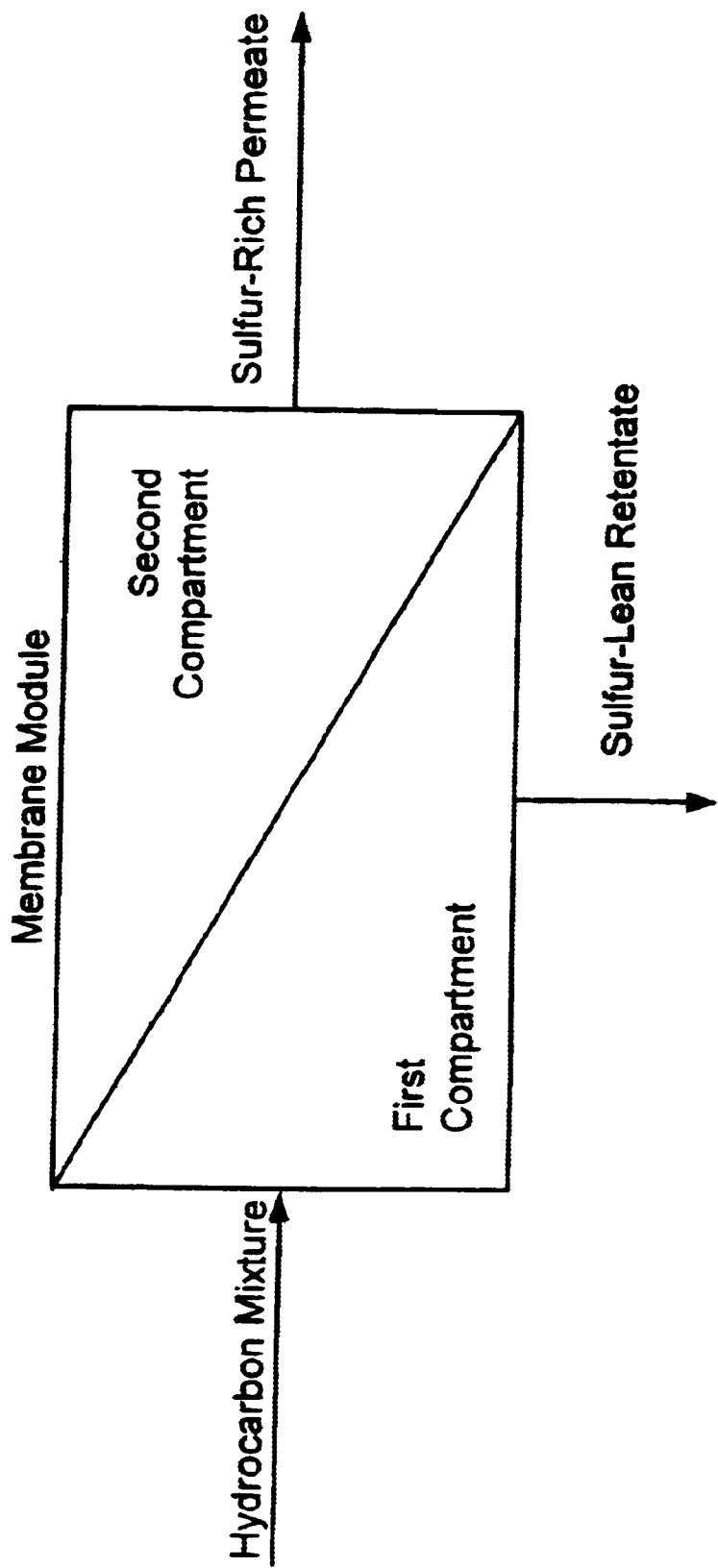

IONIC MEMBRANES FOR ORGANIC SULFUR SEPARATION FROM LIQUID HYDROCARBON SOLUTIONS

CROSS REFERENCE TO RELATED APPLICATIONS

This application is based on Provisional U.S. application Ser. No. 60/258,503 filed Dec. 28, 2000.

BACKGROUND OF THE DISCLOSURE

FIELD OF THE INVENTION

The present invention relates to the separation of sulfur compounds from a hydrocarbon mixture using an ionic membrane.

BACKGROUND OF THE INVENTION

Sulfur compounds are impurities in gasoline that compromise vehicle emission controls by poisoning the catalytic converter. In an effort to further decrease emissions, the U.S. government has recently proposed a nationwide reduction of sulfur in gasoline from current levels at 300–1000 ppm to an average of 30 ppm (Federal Register, 64(92), May 13, 1999). Gasoline producers, both domestic and foreign, selling fuel in the U.S. would be expected to comply by the year 2004.

Presently, the conventional process for reducing sulfur content in gasoline involves hydrotreating in which sulfur compounds are converted to volatile hydrogen sulfide and other organics. This energy intensive process, requiring elevated temperature and pressure, is expensive for obtaining the proposed lowered sulfur levels. Alternative processes with more efficient sulfur-reducing technology are needed to maintain progress toward cleaner burning fuels.

The use of membrane separation technology, in which select compounds or types of compounds can be separated from an organic mixture by permeation through a membrane, has been reasonably well developed. Separation processes that incorporate membranes present an attractive option for large-scale purification of petroleum fractions because of their inherent simplicity, versatility, and low energy consumption.

Typically, membrane separation processes rely on the affinity of a specific compound or class of compounds for the membrane. In this way, the components of a mixture with specific affinity for the membrane will selectively sorb onto the membrane. The sorbed compounds diffuse, or permeate, through the membrane and are removed on the opposite side. Continual withdrawal of permeated compounds from the membrane maintains the driving force for the separation process. Removal of permeated compounds is usually achieved by pervaporation or perstraction methods. Pervaporation employs a vacuum on the permeate side of the membrane, removing the permeated compounds in gaseous form, while perstraction employs a liquid sweep stream, continually washing away permeate.

The chemical properties of the membrane dictate the type of compound that has affinity for it. Some types of membranes are composed of charged chemical groups and are, therefore, considered ionic in character. An example of an ionic membrane is Nafion® (available from DuPont, of Wilmington, Del.) which is a polymer of perfluorosulfonic acid that has been used principally in the dehydration of liquid organic mixtures as described in U.S. Pat. No. 4,846,977. Only few examples exist for the use of Nafion® in separating organic compounds. U.S. Pat. No. 4,798,764 describes the separation of methanol from dimethyl carbonate or methyl t-butyl ether. The use of Nafion® membranes in the separation of mixtures of styrene and ethylbenzene has also been reported (Cabasso, Ind. Eng. Chem. Prod. Res. Dev. 1983, 22, 313). Additionally, U.S. Pat. No. 5,498,823 reports the enhanced separation of unsaturated organic compounds using silver ion-exchanged Nafion® membranes. A related ionic membrane composed of sulfonated polysulfone has been also used for the separation of aromatics and non-aromatics as disclosed in U.S. Pat. No. 5,055,631. To date, the use of ionic membranes, such as Nafion®, in the separation of sulfur compounds from liquid organic mixtures has not been reported. All of the above mentioned patents and article are incorporated herein by reference.

The proposed mandate for lowered sulfur levels in gasoline has made it imperative to improve or replace existing methods for desulfurization of petroleum fractions. A more cost-effective method for reducing sulfur content in petroleum fractions is a primary goal of the oil refining industry.

SUMMARY OF THE INVENTION

This invention relates to the separation of sulfur compounds from a hydrocarbon mixture using an ionic membrane. The membrane is composed of a material with acidic or charged chemical groups such as the perfluorosulfonic acid groups in Nafion®-type membranes. Preferred membranes permeate sulfur compounds over hydrocarbons such that a hydrocarbon mixture containing sulfur compounds is separated, by the membrane, into a sulfur-rich fraction, i.e., sulfur-rich permeate, and a sulfur-lean fraction, i.e., sulfur-lean retentate.

The present invention provides a method of separating sulfur compounds from a hydrocarbon mixture using an ionic membrane, said hydrocarbon mixture containing at least one sulfur compound and hydrocarbons, comprising the steps of:

(a) contacting said hydrocarbon mixture with said membrane;

(b) selectively permeating said sulfur compounds of said hydrocarbon mixture through said membrane forming sulfur-rich permeate and sulfur-lean retentate; and (c) retrieving said sulfur-rich permeate and said sulfur-lean retentate.

BRIEF DESCRIPTION OF THE FIGURE

The figure illustrates one embodiment of the process of the present invention for separating a hydrocarbon mixture into sulfur-rich and sulfur-lean fractions using an ionic membrane.

DETAILED DESCRIPTION OF PREFERRED EMBODIMENTS

As used herein, "hydrocarbon mixtures" refers to both synthetic mixtures and authentic oil refining fractions, each of which contain sulfur compounds. Preferable hydrocarbon mixtures include FCC gasoline mixtures and light cracked naphthas (LCN). Hydrocarbons in the mixture encompass aliphatic, aromatic, saturated, and unsaturated compounds composed substantially of carbon and hydrogen. Preferable hydrocarbons are compounds that are commonly found in oil refining fractions such as benzene, toluene, naphthalenes, olefins and paraffins. The sulfur compounds in the hydrocarbon mixtures may be in any concentration, but levels of from about 1 ppm to about 10,000 ppm are preferred and level of from about 10 ppm to about 4000 ppm are most preferred. Also, the term "sulfur compounds" means inorganic or organic compounds comprising at least one sulfur atom. Thiophenes and derivatives thereof are preferred.

As used herein, "permeate" refers to the portion of the hydrocarbon mixture that diffuses across a membrane, and "retentate" refers to the portion of the hydrocarbon mixture that does not pass through the membrane. Accordingly, the term "permeate side" refers to that side of the membrane on which permeate collects, and the term "retentate side" refers to that side of the membrane which contacts the hydrocarbon mixture. In addition, the term "sulfur-rich" means having increased sulfur content and "sulfur-lean" means having decreased sulfur content.

As used herein, "hydrophilic" means having an affinity for water or polar compounds. Additionally, "ionic" means having acidic or charged chemical groups, and "non-ionic" means having neutral chemical groups.

According to the present invention, "membrane system" is a component of a process that preferentially separates sulfur compounds from hydrocarbon mixtures. The membrane system is single or multi-staged, containing one or more membrane modules, respectively. "Membrane module" refers to a membrane assembly comprising a membrane, feed and permeate spacers, and support material, assembled such that there are at least two compartments separated by the membrane. The membrane module may be any workable configuration such as flat sheet, hollow fibers, or spiral-wrapped.

As used herein, "transport agent" refers to an additive in the hydrocarbon mixture for augmenting flux and selectivity of the separating membrane. Transport agents include alcohols, glycols, ethers or any other compounds that are miscible with hydrocarbon mixtures, are sorbed by the ionic membrane, and increase flux through the membrane. A low boiling transport agent such as methanol is preferred for ease of removal by distillation. The quantity of transport agent added to the hydrocarbon mixture is preferably about 1% to about 20% by weight. Addition of about 10% by weight of methanol is more preferred. The transport agent also may comprise the sweep stream in perstraction processes.

As used herein, "Nafion®-type membrane" refers to a polymer of perfluorosulfonic acid or a derivative thereof. Derivatives include Nafion®-type membranes having undergone ion-exchange or reaction with organic bases. "Nafion," according to L. Gardner's *Chemical Synonyms and Tradenames*, 9$^{th}$ ed., 1989, is defined as a perfluorosulphonic acid membrane (DuPont).

The hydrocarbon mixtures treated by the present invention encompass both synthetic mixtures and authentic oil refniing fractions, each of which contain sulfur compounds. Preferable hydrocarbon mixtures include FCC gasoline mixtures and light cracked naphthas (LCN). The sulfur compounds in the hydrocarbon mixtures may be in any concentration, but levels of from about 1 ppm to about 10,000 ppm are preferred, and levels of from about 10 ppm to about 4000 ppm are more preferred. The sulfur compounds can also be of any type, including inorganics, however organic compounds are preferred and thiophenes and derivatives thereof are more preferred. Hydrocarbons in the mixture encompass aliphatic, aromatic, saturated, and unsaturated compounds composed essentially of carbon and hydrogen. Preferable hydrocarbons are compounds that are commonly found in oil refining fractions including, but not limited to, benzene, toluene, naphthalenes, olefins and paraffins. A transport agent may be optionally added to the hydrocarbon mixture to augment flux and selectivity of the separating membrane. Transport agents include, but are not limited to, alcohols, glycols, ethers or any other compounds that are miscible with hydrocarbon mixtures and enhance flux through a membrane. A low boiling transport agent such as methanol is preferred for ease of removal by distillation. The quantity of transport agent added to the hydrocarbon mixture is preferably about 1% to about 20% by weight. Addition of about 10% by weight of methanol is more preferable.

According to the present invention, the membrane separation of sulfur compounds from a hydrocarbon mixture involves the selective permeation, or diffusion, of sulfur compounds through a membrane. Generally, but not always, selective sorption of components of a mixture are controlled by the affinity of the components for the membrane. Components with greater affinity for the membrane generally permeate more rapidly. Thus, in the present invention, ionic membranes which have affinity for, or preferentially permeate, sulfur compounds usually are preferred. Ionic membranes are defined as containing charged chemical groups including salts and acids, in contrast to non-ionic membranes which contain neutral chemical groups. Ionic membranes can be of any suitable composition, and incorporate either or both inorganic and organic materials. Examples of charged chemical groups found in ionic membranes include, but are not limited to, sulfonic acids, carboxylic acids, and their corresponding alkali or transition metal salts. Ammonium salts are also amenable to the methods of the present invention.

Preferred ionic membranes according to the present invention are Nafion®-type acidic membranes, such as Nafion® 117, that have been optionally treated by ion-exchange reactions or with bases. Nafion belongs to a class of solid superacids that exhibit acid strength greater than 100% sulfuric acid. Nafion® is strongly hydropohilic, owing to sulfonic acid groups ($-SO_3H$) associated with electron-withdrawing perfluorocarbon chains ($-CF_2CF_2-$). Ion-exchanged Nafion® membranes, in which the acidic protons are replaced by other cations, are also within the scope of this invention. Examples of suitable cations include, but are not limited to, inorganic ions such as silver, copper, sodium, and organic ions such as tetraalkylammoniums and tetraalkylphosphoniums. In another aspect of the present invention, the Nafion®-type membranes may be treated with organic bases including, but not limited to, triethanolamine and pyridine, thereby forming organic salts. Nafion®-type membrane modification by reaction with organic bases results in increased selectivity for sulfur compounds over saturates and olefins.

Ionic membranes generally perform best in the presence of a transport agent. For example, when a Nafion®-type membrane is contacted with a transport agent, it swells from sorption of the transport agent, changing the microstructure of the polymer such that flux through the membrane is enhanced. Transport agents include, but are not limited to, alcohols, glycols, ethers or any other compounds that are miscible with hydrocarbon mixtures, are sorbed by the ionic membrane, and increase flux through the membrane. It is preferred that the transport agent is an alcohol. It is more preferred that the transport agent is methanol.

The present invention also encompasses a process for the separation of sulfur compounds from hydrocarbon mixtures. According to the process, a hydrocarbon mixture is split into a sulfur-rich fraction, i.e., sulfur-rich permeate, and a sulfur-lean fraction, i.e., sulfur-lean retentate, using a membrane system. The sulfur-rich fraction, or permeate, corresponds to the portion of the hydrocarbon mixture that diffused through the membrane. The sulfur-lean fraction, or retentate, corresponds to the portion of the hydrocarbon mixture that does not pass through the membrane. The hydrocarbon mixture treated by the process is preferably light cracked naphtha (LCN); however, any oil refining fraction or organic mixture contaminated with sulfur compounds is suitable. The sulfur compounds in the hydrocarbon mixtures may be in any concentration, but levels of from about 1 ppm to about 10,000 ppm are preferred, and levels of from about 10 ppm to about 4000 ppm are more preferred.

A transport agent may be optionally added to the hydrocarbon mixture for facilitating transfer of sulfur compounds through the membrane. The transport agent may be removed in subsequent steps by distillation of either or both sulfur-rich and sulfur-lean fractions. The sulfur-lean fraction exiting the membrane system has a sulfur content less than the hydrocarbon mixture feed, preferably about 1 ppm to about 300 ppm sulfur, more preferably about 1 ppm to about 100 ppm sulfur, and most preferably about 1 ppm to about 50 ppm sulfur. The sulfur-rich fraction is combined with other hydrocarbon mixtures such as heavy cracked naphtha (HCN) for conventional removal of sulfur compounds by hydrotreating. The hydrotreated stream can be optionally combined with the sulfur-lean fraction for further refining or fuel formulation.

The membrane system of the separation process can be single-staged such that it is composed of one membrane module, or may be multi-staged such that it is composed of more than one membrane module. Each module has at least two compartments separated by a membrane assembly, the assembly preferably comprising a membrane, feed spacers, and support material. Membrane modules can be any reasonable size and shape, including hollow fibers, stretched flat sheet, or preferably, spiral-wound envelopes. In the spiral-wound configuration, the open sides of membrane envelopes are positioned and sealed over a permeate receptacle such as perforated piping. The envelopes are spirally wrapped around the receptacle to minimize volume. Feed spacers, such as plastic netting or nylon mesh, separate the membrane envelopes to allow penetration of the hydrocarbon mixture between the wrapped layers. The interior of each membrane envelope is fitted with a permeate spacer to channel permeate toward the receptacle. The permeate spacer is preferably composed of a material that is flexible, porous, and inert such as polyester. The membrane preferably is mounted on a stiff but flexible porous backing which is directed toward the inside of the envelope. Backing materials are preferably resistant to organic mixtures and include polyester, ceramic, glass, paper, plastic, or cotton. Cushions composed of a flexible, inert material may flank either side of the permeate spacer inside the membrane envelope and contribute to structural integrity of the membrane assembly under applied pressure.

The membrane preferably possesses certain qualifies to function effectively in a process for separating sulfur compounds from hydrocarbon mixtures. In addition to selectivity for sulfur compounds, desirable membrane qualities include resistance to operative conditions such as thermal stress, sustained hydraulic pressure, and prolonged contact with organic chemical mixtures. Membrane thickness may vary from about 0.1 microns to about 200 microns, but thinner membranes are preferred for higher flux such as, for example, membranes having a thickness of about 0.1 microns to about 50 microns, or more preferably, about 0.1 microns to about 1 micron.

The membrane system can be operated under either perstraction or pervaporation conditions. Under perstraction conditions, a liquid sweep stream passes across the permeate side of the membrane, dissolving and removing permeated sulfur compounds. In this manner, a concentration gradient is maintained, driving the transfer of sulfur compounds from the retentate side of the membrane to the permeate side. The sweep liquid preferably has affinity for, and is miscible with, the permeated components. Methanol is a preferred sweep liquid for membrane units employing Nafion®-type membranes. Under pervaporation conditions, a vacuum is pulled on the permeate side of the membrane, thus removing permeate as a vapor and sustaining the driving force with a pressure differential. The vapor is cooled and condensed to a liquid and may be optionally heated prior to delivery to subsequent membrane modules. A detailed discussion of perstraction and pervaporation can be found in *Membrane Handbook*, W. S. Ho and K. K. Sirkar, Eds., Chapman and Hall, 1992, herein incorporated by reference.

Typical process conditions according to the present invention depend on several variables including membrane separation method (i.e., pervaporation vs. perstraction) and feed composition. Determination of appropriate pervaporative and perstractive operating conditions is well within the capabilities of one skilled in the art. Some typical operating parameters for perstractive processes of the present invention include absolute membrane flux of from about 0.5 to about $150 \, kg \cdot m^{-2} D^{-1}$, feed temperature of from about 20° C. to about 300° C., and negligible pressure drop across the membrane. Additionally, some typical operating parameters for pervaporative processes of the present invention include an absolute membrane flux of from about 0.5 to about 150 $kg \cdot m^{-2} \, D^{-1}$, feed temperature of from about 20° C. to about 300° C., and lowered pressure on the permeate side measuring from about 1 to about 80 mmHg.

Advantages of the present invention are numerous. The separation of sulfur compounds from hydrocarbon mixtures such as oil refining fractions allows the concentration of sulfur contaminants such that a smaller total volume of liquid needs to be processed by conventional hydrotreating. Additionally, selectivity of the membrane for sulfur compounds over unsaturated hydrocarbons results in a low olefin content in the sulfur-rich stream and reduced octane loss and hydrogen consumption during the hydrotreating process.

Those skilled in the art will appreciate that numerous changes and modifications may be made to the preferred embodiments of the present invention, and that such changes and modifications may be made without departing from the spirit of the invention. It is, therefore, intended that the appended claims cover all such equivalent variations as fall within the true spirit and scope of the present invention.

EXAMPLES

Example 1

Separation of Sulfur Compounds Using Nafion®-Type Membranes.

Table 1 lists the results of pervaporative separation experiments using various Nafion®-type membranes and a synthetic feed solution with a composition of 10:48:31:10:1 methanol:toluene:heptane:1-octene:thiophene by weight. Enhanced selectivity is observed for ion-exchanged and base-treated membranes, and the positive effects of a transport agent are evident. In Table 1, selectivity is expressed as the ratio of thiophene to other mixture components in the permeate. Enhanced selectivity of thiophene over the other mixture components is shown by higher selectivity ratios compared with the feed ratios given in the first line of the table.

TABLE 1

Pervaporative Organic Liquid Separation Using Nafion ® Membranes:
Synthetic Feed (by weight) 10 methanol:48 toluene:31 heptane:10 1-octene:1 thiophene.

| | | SELECTIVITIES | | | | |
|---|---|---|---|---|---|---|
| Entry | Membrane | Thiophene: Toluene | Thiophene: Heptane | Thiophene: 1-octene | Absolute Flux (kg m$^{-2}$D$^{-1}$) | Normalized Flux (kg m$^{-2}$D$^{-1}$μ$^{-1}$) |
| Feed | | 0.021 | 0.032 | 0.10 | — | — |
| 1 | Nafion ® 117 (H+) | 3.4 | 16 | 18 | 14.0 | 2448 |
| 2 | Nafion ® 117 (Na+) | 2 | 36 | 17 | 10.8 | 1889 |
| 3 | Nafion ® 117 (Cu+) | No permeate observed | | | | |
| 4 | Nafion ® 117 (Ag+) | No permeate observed | | | | |
| 5 | Nafion ® 117 (H+) Neutralized with triethanolamine | 2.2 | 124 | 35 | 4.8 | 914 |
| 6 | Nafion ® 117 (H+) Neutralized with pyridine | 2.2 | 110 | 35 | 4.9 | 933 |
| 7 | Nafion ® 117 (H+) No methanol present in feed | No permeate observed | | | | |

Example 2

Separation of Sulfur Compounds Using Nafion®-Type Membranes.

Table 2 shows results of a pervaporative separation experiment using triethanolamime-treated Nafion® membrane and light FCC gasoline feed diluted with 10% by weight methanol. The total sulfur content in the hydrocarbon mixture, disregarding the methanol component, increases from 950 ppm to about 5000 ppm in the permeate. Selectivity ratios indicate the higher sulfur content of the permeate.

TABLE 2

Pervaporative Organic Liquid Separation Using Nafion ® Membranes: Light FCC Gasoline (bp < 250° F.; 950 ppm total sulfur).

| | | SELECTIVITIES | | | | |
|---|---|---|---|---|---|---|
| Entry | Membrane | Thiophene: C$_6$ Paraffins | Thiophene: C$_6$ Olefins | Thiophene: C$_6$ Aromatics | Absolute Flux (kg m$^{-2}$D$^{-1}$) | Normalized Flux (kg m$^{-2}$D$^{-1}$μ$^{-1}$) |
| 1 | Nafion ® 117 (H+) | 68 | 65 | 13 | 5.4 | 944 |

What is claimed is:

1. A method of separating sulfur compounds from a hydrocarbon mixture using an ionic membrane, said hydrocarbon mixture containing at least one sulfur compound and hydrocarbons, comprising the steps of:
   (a) contacting said hydrocarbon mixture with said membrane;
   (b) selectively permeating said sulfur compounds of said hydrocarbon mixture through said membrane forming sulfur-rich permeate and sulfur-lean retentate; and
   (c) retrieving said sulfur-rich permeate and said sulfur-lean retentate.

2. The method of claim 1 wherein said ionic membrane is a polymer of perfluorosulfonic acid and derivatives thereof.

3. The method of claim 2 wherein said ionic membrane comprises organic salts.

4. The method of claim 2 wherein said ionic membrane comprises sodium ions.

5. The method of claim 1 wherein said sulfur compound is thiophene or a derivative of thiophene.

6. The method of claim 1 wherein said sulfur-lean fraction contains 1 to about 300 ppm of sulfur.

7. The method of claim 6 wherein said sulfur-lean fraction contains 1 to about 100 ppm of sulfur.

8. The method of claim 7 wherein said sulfur-lean fraction contains 1 to about 50 ppm of sulfur.

9. The method of claim 1 wherein said hydrocarbon mixture is light cracked naphtha.

10. The method of claim 1 wherein said hydrocarbon mixture contains 10 to about 4,000 ppm of sulfur.

11. The method of claim 1 wherein said hydrocarbon mixture contains a transport agent.

12. The method of claim 11 wherein said transport agent is an alcohol.

13. The method of claim 12 wherein said alcohol is methanol.

* * * * *